F. W. YOUNG.
CARBONIZING APPARATUS.
APPLICATION FILED DEC. 27, 1919.
1,397,029.
Patented Nov. 15, 1921.
2 SHEETS—SHEET 2.
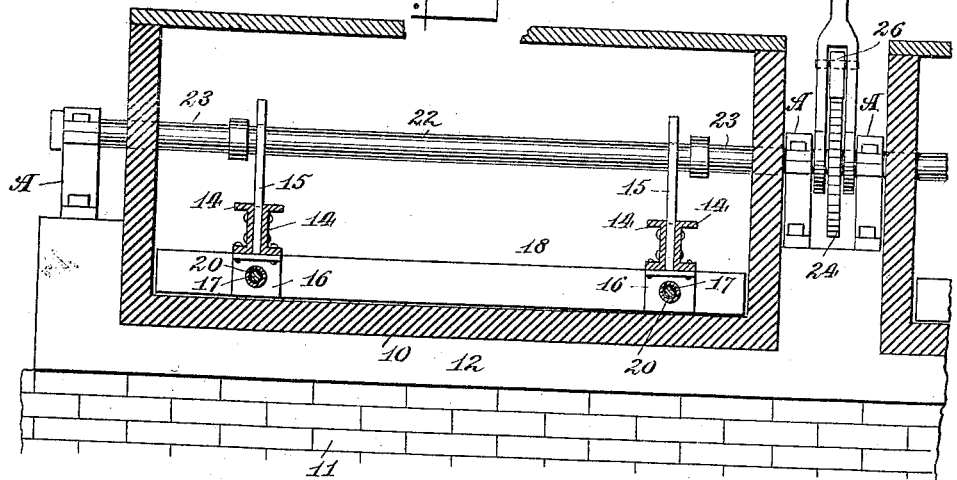
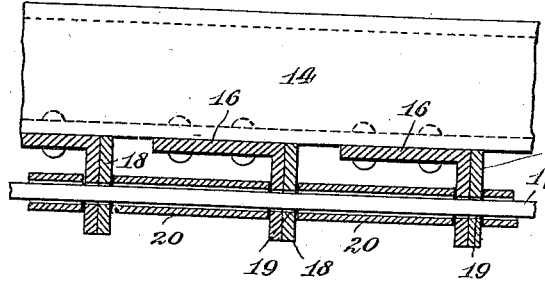
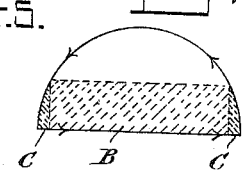
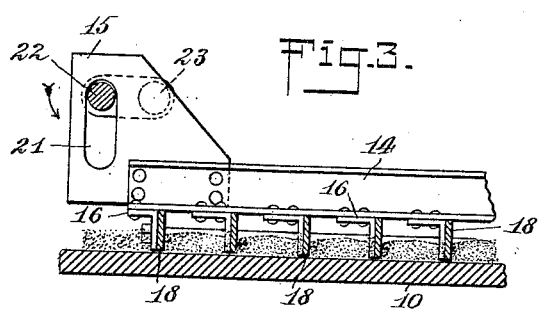
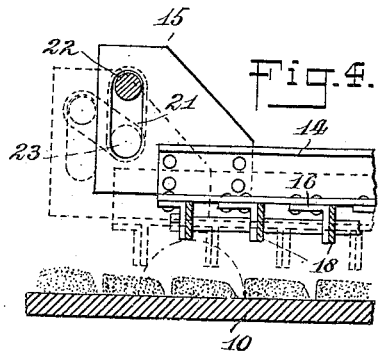
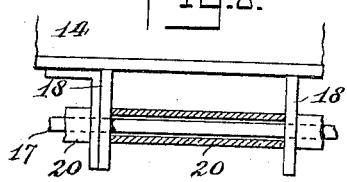
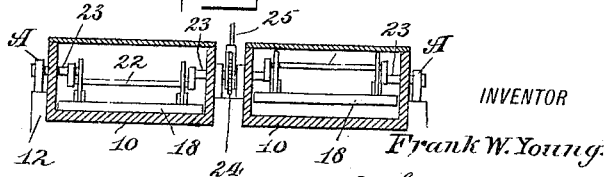
INVENTOR
Frank W. Young.
George Cook & Sons
ATTORNEYS

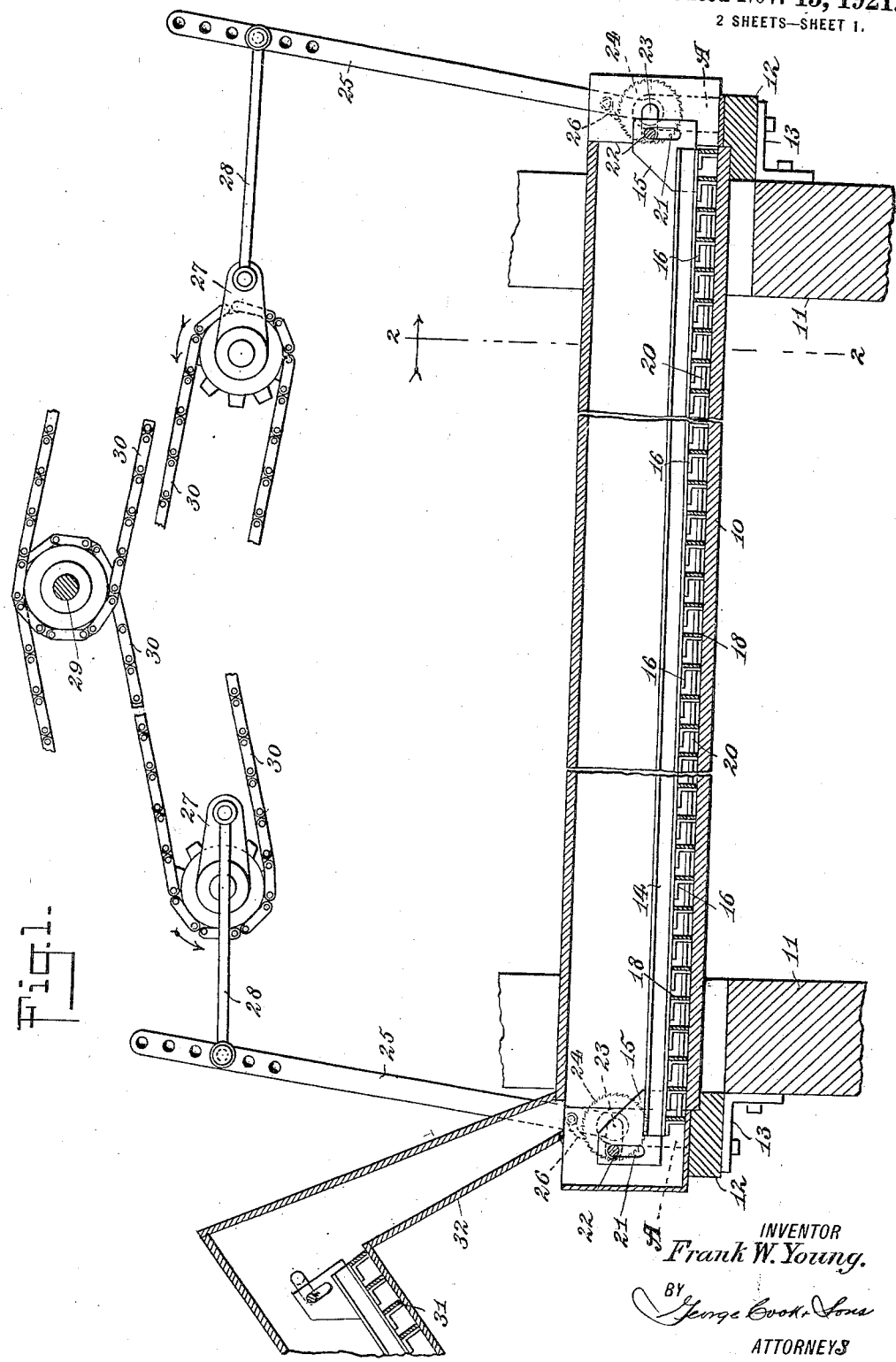

UNITED STATES PATENT OFFICE.

FRANK W. YOUNG, OF VERONA, NEW JERSEY.

CARBONIZING APPARATUS.

1,397,029.  Specification of Letters Patent.  Patented Nov. 15, 1921.

Application filed December 27, 1919. Serial No. 347,794.

*To all whom it may concern:*

Be it known that I, FRANK W. YOUNG, a citizen of the United States, and a resident of Verona, in the county of Essex and State of New Jersey, have made and invented certain new and useful Improvements in Carbonizing Apparatus, of which the following is a specification.

My invention relates to a carbonizing apparatus, and particularly to the conveying mechanism therefor.

An object of the present invention is to provide a carbonizing apparatus, which will thoroughly and uniformly heat and carbonize the material which is introduced therein.

A further object is to provide an improved conveyer mechanism, which will move and convey material across a retort, or along a trough in a slow and intermittent manner so that the particles of the material will be thoroughly intermixed and uniformly subjected to the action of heat so that a complete and uniform carbonization of the material takes place.

A further object is to provide a carbonizing apparatus having a conveyer which is of simple construction; so designed that the blades which propel the material forward are moved upwardly above the bottom wall of the retort during their return stroke describing an arc of a circle, of which the forward movement constitutes a chord, the parts being preferably so proportioned that the arc conforms substantially with a semi-circle and the chord conforms substantially to the diameter of the same whereby the maximum forward travel for each particle of the conveyed material is obtained, and the least backward movement and displacement of material results during the rear or return stroke of the scraper blades.

A further object is to provide a conveyer for a carbonizing apparatus wherein the scraper blades are so spaced and positioned with relation to their path of travel that each blade upon reaching its extreme rearward movement will occupy a position between the position occupied by the blades at the extreme end of their forward movement, whereby the piles of conveyed material which collect and are moved forwardly between the scraper blades during each cycle, are divided, and the parts of adjoining piles are brought together and collected to form new piles, which in turn are moved progressively forward and again divided so that a thorough intermixing of the material is obtained as it is moved forwardly through the carbonizing retort.

A further object is to provide a carbonizing apparatus which is of simple construction and rugged design, composed of but few parts and which parts may be easily and readily assembled or dismembered for the purpose of repair or removal.

With the foregoing and other objects in view, which will appear as this specification proceeds, my invention resides in the combination and arrangement of parts and in the details of construction as hereinafter described and claimed and illustrated in the accompanying drawings, wherein the preferred embodiment of my invention has been shown.

In said drawings:—

Figure 1 is a view in side elevation and partially in section of my improved carbonizing apparatus.

Fig. 2 is a view in vertical section taken on the line 2—2 of Fig. 1.

Fig. 3 is a diagrammatic view in side section illustrating the manner in which the rakes are supported and moved along the diameter and arc of a semi-circle.

Fig. 4 is a similar view illustrating the rakes in certain other phases of their movements and also bringing out the grouping, and shapes of the groups, of the conveyed material as it is moved in a forward direction.

Fig. 5 is an enlarged view in side elevation and partially in section of one of the rakes and illustrating the method of mounting and supporting the scraper blades.

Fig. 6 is a view in transverse section showing the tandem mounting of the conveyers so as to produce a balanced torque throughout the movement of the rakes.

Fig. 7 is a view of the motion or displacement diagram of the rakes, and

Fig. 8 is a view similar to Fig. 5 illustrating a method of supporting the scraper blades.

Referring specifically to the several views wherein similar reference numerals designate corresponding parts throughout, the carbonizing apparatus is composed of a retort 10, which projects through the walls 11, of a furnace and is supported at its outer ends by the bed plates 12, brackets 13 are secured to the bed plates and attached to the walls and accordingly hold the retort securely in place. A cover is provided for the retort and protects the material, which is being carbonized, from the flames and products of combustion, and also allows suitable provision to be made for collecting the gases and products of distillation.

Located within the retort 10 is the rake. which is composed of the spaced longitudinally extending beams 14, preferably built up of channel members and supported at their extremities by the end plates 15. Secured to the underside of the beams are the spaced angle supports 16, through which project the holding rods 17. The angle supports are arranged in corresponding pairs and between which extend the scraper blades 18. The scraper blades are provided with suitable openings through which the holding rods 17 extend and the said blades are held against the front face of the downwardly projecting leg of each angle support by the spacers 20, the latter being preferably formed of short lengths of pipe, or tubing. The openings in the scraper blades are preferably made a little larger than the holding rods 17, so that a limited amount of vertical play is provided for each of the scraper blades.

The end plates 15 of the rake are provided with the vertical extending slots 21, through which project the offset arms 22, of the crank shafts 23, there being a crank shaft located at each end of the retort and supported and mounted for rotation by the bearings or pillow blocks A.

In order that the rake and each scraper blade thereof will translate along a path approximately as illustrated in Fig. 7, the slots within the end supporting plates of the rake are made slightly longer than the radius or throw of the crank arms and extend to a height such that the crank arms will be on the point of contact with the upper extremities of the slots when the crank arms lie in a plane parallel to the bottom wall of the retort. Assuming the crank arms in this latter mentioned position as illustrated in Fig. 1, as the crank shafts are rotated in an anti-clockwise direction, the rake and its scraper blades are moved in a translatory manner, first along the bottom wall of the retort, corresponding to the diametric line of the diagram of Fig. 7, until the crank shafts have turned through 180 degrees and again occupy a position parallel to the bottom wall of the trough. The further rotation of the crank shafts moves the scraper blades upwardly, and backwardly, along the arc of a semi-circle and in so doing, lifts the blades above the material contained within the retort, which elevated position the blades occupy during approximately the entire return stroke of the rake.

In order to balance, as far as practical, the forces brought into play during the cycle of movement of the rakes, I have preferably combined two or more conveyers by placing them side by side and utilizing either common or connected shafts as clearly illustrated in Fig. 6. In this connection, it is also to be noted that a number of the carbonizing apparatus as herein described may be embodied in a single furnace, the same being preferably arranged in a series of layers so as to allow the heat and products of combustion of the furnace to flow freely therearound, and thus facilitate the carbonizing action.

In order to actuate the crank shafts in a slow and intermittent manner, each crank shaft is provided with a ratchet wheel 24 with which coöperates a lever 25 and a pawl 26. The continuous oscillation of the levers will acordingly produce an intermittent and uni-directional rotation of the crank shafts. The levers are oscillated by means of the crank arms 27, and the links 28, the former being positively driven from a common power shaft 29 through the intervention of the chains 30. The positive drive of the crank arms 27 insures the equal rotation of the crank shafts 23 and their maintenance in similar phase positions. The links 28 are adjustable lengthwise of the levers 25, whereby the velocity of rotation of the crank shafts may be adjusted.

A second conveyer 31 is used to introduce material into the retort or trough 10, and is preferably made similar to the conveyer just described in order that the amount of material delivered to one end of the retort will be equal to the amount of material the conveyer in the retort is able to handle. The conveyer 31 is preferably arranged at an angle as shown in Fig. 7 providing for the convenient handling of the material.

It has been found in practice that it is not necessary to provide each and every blade with a supporting angle and in some instances the spacers 20 are made long enough to project between adjacent scraper blades and the intermediate supporting angles are omitted as illustrated in Fig. 8, thus effecting considerable saving in weight, and providing for greater ease in assembling and dismembering the apparatus.

In order that each pile of material which collects in front of the scraper blades may be divided and joined with the divided portions of adjacent piles, the spacing of the scraper blades is made unequal to an integral multiple of the radius or throw of the crank shaft. Or, to state it in another way, the diameter of the crank shaft circle is made unequal to an integral multiple of the spacing of the scraper blades. Thus in the present instance the spacing of the scraper blades, is made equal to 4/3 of the radius or 2/3 of the diameter of the circle of movement of the crank shaft, so that the scraper blades in returning from their foremost position, travel above the piles of material and settle down in the center of the piles next adjacent to the piles in the rear thereof, so that each pile of material as it progresses forwardly is divided and joined with a portion of the next adjacent pile, which in turn is then sub-divided so that a thorough mixing of the material is had, as it moves across the retort.

It is to be understood in connection with the foregoing, however, that I do not limit myself to the exact arrangement whereby the piles of material are divided in halves, as it will be readily appreciated that I may so arrange the apparatus that the piles will be divided into unequal parts and the unequal parts of adjacent piles then joined together; without departing from the spirit of my invention.

In Fig. 7, I have illustrated the very small percentage of material which is moved backwardly or rearwardly during the return stroke of the scraper blades, thus if the height of the sectioned area B represents the height of the material within the retort, then the small areas C will represent the percentage of backward or return movement of the scraper blades which tend to move the material in a backward or reverse direction, and the section B represents the forward and useful portion of the working stroke. With the parts as constructed as hereinbefore outlined, I have found that a most efficient and uniform carbonization of the material introduced within the retort takes place, the material is prevented from sticking and binding to the bottom of the retort and the intermittent manner in which the material is moved through the retort provides for the uniform heat treatment thereof while the dividing and sub-dividing of the material which takes place, provides for a thorough intermixing of the particles of the material and aids in the uniform carbonization thereof.

Having thus described my invention, what I claim is:—

1. An apparatus of the class described comprising a surface along which material is to be moved, a conveyer associated therewith, and means for mounting said conveyer with relation to said surface so as to intermittently move the material in a forward direction along said surface and to divide the material into piles, sub-divide the said piles, and join the adjacent sub-divisions of the piles of material.

2. A carbonizing apparatus comprising a retort, and a conveyer associated therewith adapted to intermittently move the material within the retort in a forward direction, and to divide the material into piles, sub-divide the said piles, and join the adjacent sub-division of the piles of material in a cyclic manner.

3. An apparatus comprising a trough, means for moving material along the bottom wall thereof including a rake having scraper blades and means for moving the said scraper blades in a forward direction along the chord of a circle and returning the scraper blades to their original position along an arc of the said circle.

4. An apparatus of the class described comprising a trough, a rake having scraper blades, crank shafts engaging slotted plates carried by said rake and adapted to move said scraper blades in a forward direction along the chord of a circle and return the scraper blades to their original position along an arc of a circle.

5. A conveyer for a carbonizing apparatus comprising a rake having scraper blades thereon and means connected to said rake and adapted to move the scraper blades thereof forwardly along the diameter of a semi-circle and rearwardly along the arc of the semi-circle.

6. A carbonizing apparatus comprising a retort, a conveyer located therein and comprising a rake, means for moving the rake along the approximate diameter of a semi-circle for the forward movement of the conveyed material and adapted to return the blades to their original position along approximately the arc of a semi-circle, of which the said forward movement represented the approximate diameter, and means for causing the said motion of the blades to take place in an intermittent manner.

7. A conveyer for a carbonizing apparatus comprising a rake, including scraper blades, and means for moving the same forwardly along a plane surface and rearwardly along the arc of a circle, the forward movement of the blades being unequal to an integral multiple of the spacing of the scraper blades.

8. A carbonizing apparatus comprising a retort having a plane bottom wall, a conveyer mounted within said retort, said conveyer including a rake, means for moving the said rake in a translatory path representing approximately the arc and diameter of a semi-circle and means associated with said conveyer whereby the said motion of the rake takes place in an intermittent manner.

9. A carbonizing apparatus comprising a retort, a conveyer located therein and including a rake having spaced scraper blades, means associated with said rake whereby the same is intermittently moved in a translatory manner along the approximate diameter and arc of a semi-circle, the diameter of the said semi-circle being unequal to an integral multiple of the spacing of the scraper blades.

10. A conveyer comprising a rake including scraper blades, end plates secured to said rake and provided with slots therein and crank shafts with the offset arms thereof extending through said slots in the end plates, the said slots being equal to or greater than the radius of the offset arms of the crank shaft.

11. A rake for an apparatus of the class described consisting of a longitudinally extending beam, angle members attached to the lower face thereof and provided with openings therein, a rod extending through the openings in said angle members, scraper blades having openings therein mounted upon said rod and spacers mounted upon said rod and holding said scraper blades against said angle members.

12. An apparatus of the class described comprising conveyer mechanisms, each mechanism including rakes, crank shafts connected to said rake and adapted to move said rake along the chord of a circle and rearwardly along the arc of a circle, the crank shafts of adjoining retorts being connected together to equalize the torque due to the weight of the rakes, and means for intermittently rotating said crank shafts.

13. An apparatus of the class described including a surface along which it is desired to move material, crank shafts located adjacent the extremities thereof, a rake connected to said crank shafts by slotted plates and adapted to move in a translatory path along the arc and chord of a circle, ratchet wheels mounted upon said crank shafts, levers and pawls engaging said ratchet wheels, adapted to intermittently rotate said crank shafts, means for positively oscillating said levers, and positive driving means between said crank shafts.

14. A rake for an apparatus of the class described comprising a longitudinally extending beam, angle members attached to the lower face thereof and provided with openings in the downwardly extending legs, a rod extending through said openings in said angle members, scraper blades having openings therein mounted upon said rod, and tubular spacers mounted upon said rod and holding said scraper blades in proper position.

15. A rake for an apparatus of the class described comprising a pair of spaced longitudinally extending beams, angle members attached to the lower face thereof arranged in pairs and provided with openings in the downwardly extending legs thereof, a rod extending through said openings, scraper blades having openings larger than said rods and receiving the said rods therethrough and providing for the limited play or movement of said scraper blades, and tubular spacers mounted upon said rods and holding said scraper blades in proper position.

16. An apparatus of the class described including a surface along which it is desired to move material, a rake, a crank shaft mounted above said surface, a member carried by said rake and engaging said crank shaft and adapted to cause the forward movement of the rake along said surface during a portion of the rotation of said crank shaft and to lift the said rake above the said surface and return it while raised to its original position along the arc of a circle.

17. An apparatus of the class described including a surface along which material is to be moved, a rake, spaced crank shafts, plates provided with slots therein carried by said rake and receiving the crank shafts in said slots, the said slots being so arranged as to position and length as to cause the said rake, upon the rotation of said crank shaft, to move forwardly along said surface while resting thereon, and to return to its original position along the arc of a circle when in an elevated position, substantially as described.

Signed at New York, borough of Manhattan, in the county of New York and State of New York, this 26th day of December, A. D. 1919.

FRANK W. YOUNG.

Witnesses:
A. T. GRAY,
EMILY A. SMITH.